United States Patent [19]

Schatteman et al.

[11] 4,447,900

[45] May 8, 1984

[54] AUTOMATIC VIDEO DISC INVERTING MECHANISM

[75] Inventors: Etienne A. Schatteman, Wemmel; Stephane M. A. d'Alayer de Costemore d'Arc, Ways, both of Belgium

[73] Assignee: Staar S, Brussels, Belgium

[21] Appl. No.: 351,410

[22] Filed: Feb. 23, 1982

[30] Foreign Application Priority Data

Apr. 17, 1981 [BE] Belgium .............................. 888484
Nov. 16, 1981 [BE] Belgium .............................. 891132

[51] Int. Cl.³ .......................... G11B 17/04; G11B 1/00
[52] U.S. Cl. ................................ 369/200; 369/75.1; 369/195
[58] Field of Search ............... 369/195, 199, 200, 75.1

[56] References Cited

U.S. PATENT DOCUMENTS

| | | | |
|---|---|---|---|
| 1,872,707 | 8/1932 | Erbe ..................................... | 369/195 |
| 2,034,245 | 3/1936 | Ord ..................................... | 369/200 |
| 2,311,596 | 2/1943 | Pressley .............................. | 369/200 |
| 2,313,262 | 3/1943 | Pressley .............................. | 369/200 |
| 2,332,650 | 10/1943 | Knox et al. ......................... | 369/200 |
| 2,492,874 | 12/1949 | Matarazzo ........................... | 369/200 |
| 4,068,851 | 1/1978 | Yamamura ............................ | 369/79 |
| 4,098,511 | 7/1978 | Leedom ............................... | 369/77.2 |
| 4,123,066 | 10/1978 | Minemura et al. .................. | 369/200 |
| 4,196,907 | 4/1980 | Takizawa et al. .................. | 369/200 |

Primary Examiner—Steven L. Stephan
Attorney, Agent, or Firm—Leydig, Voit, Osann, Mayer and Holt, Ltd.

[57] ABSTRACT

A video disc player having a base and a protective cover pivotally hinged on the base and adapted to be opened and closed to permit a disc to be inserted or removed from the rotary drive assembly is provided with a device for automatically turning over a disc carried by the rotary drive assembly as an incident to opening and closing the cover by powered drive units; the turning over includes a ninety degree phase in which the disc slides under its own weight between substantially vertical and horizontal positions while the bottom edge of the disc slides laterally and a ninety degree phase in which the disc pivots about the bottom edge between substantially horizontal and vertical positions; guides are provided on the underside of the cover and the base for guiding both the bottom edge and the top edge of the disc during its sliding movement and for supporting the bottom edge of the disc for pivotal movement about an axis adjacent the pivotal axis of the cover.

22 Claims, 21 Drawing Figures

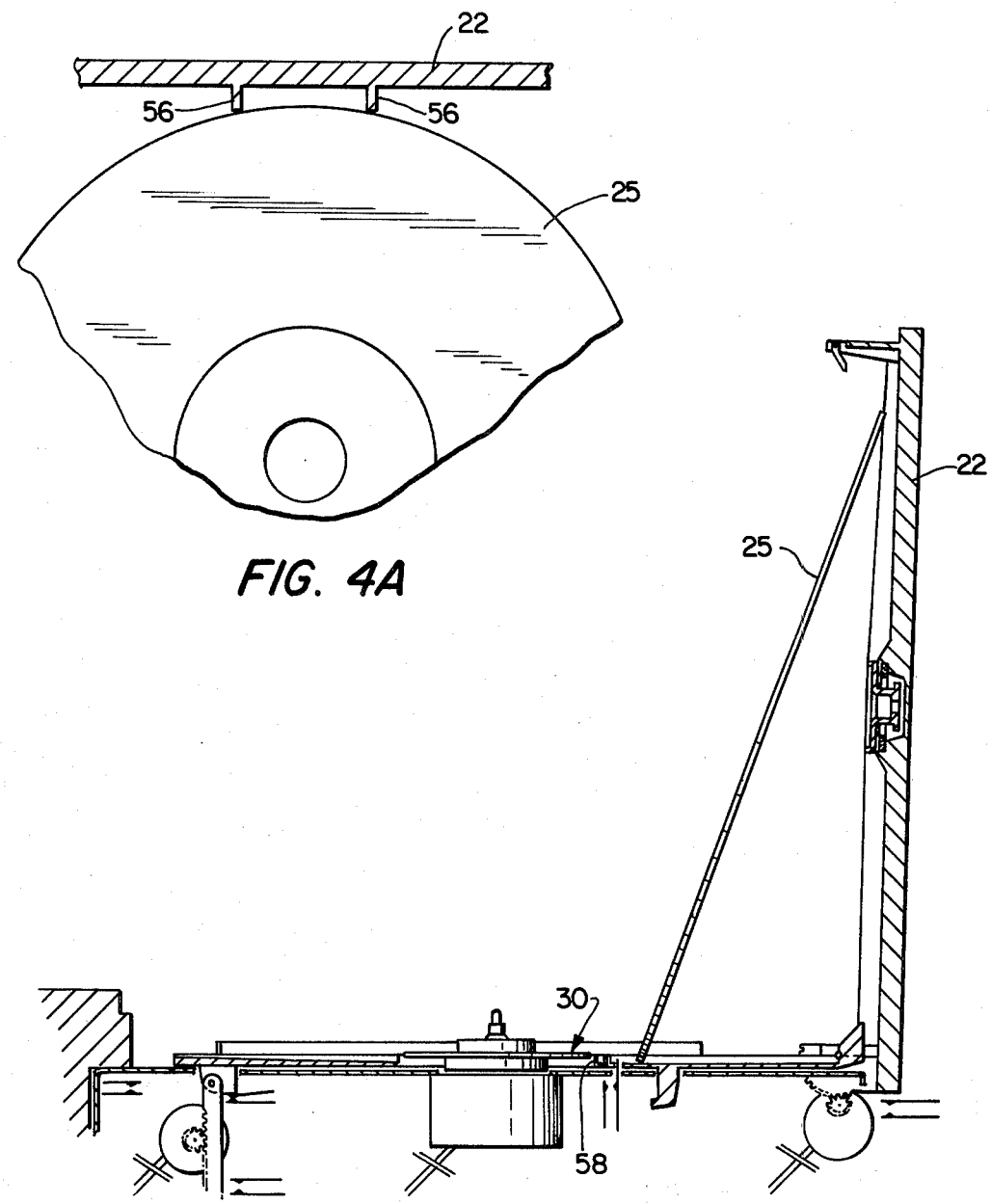

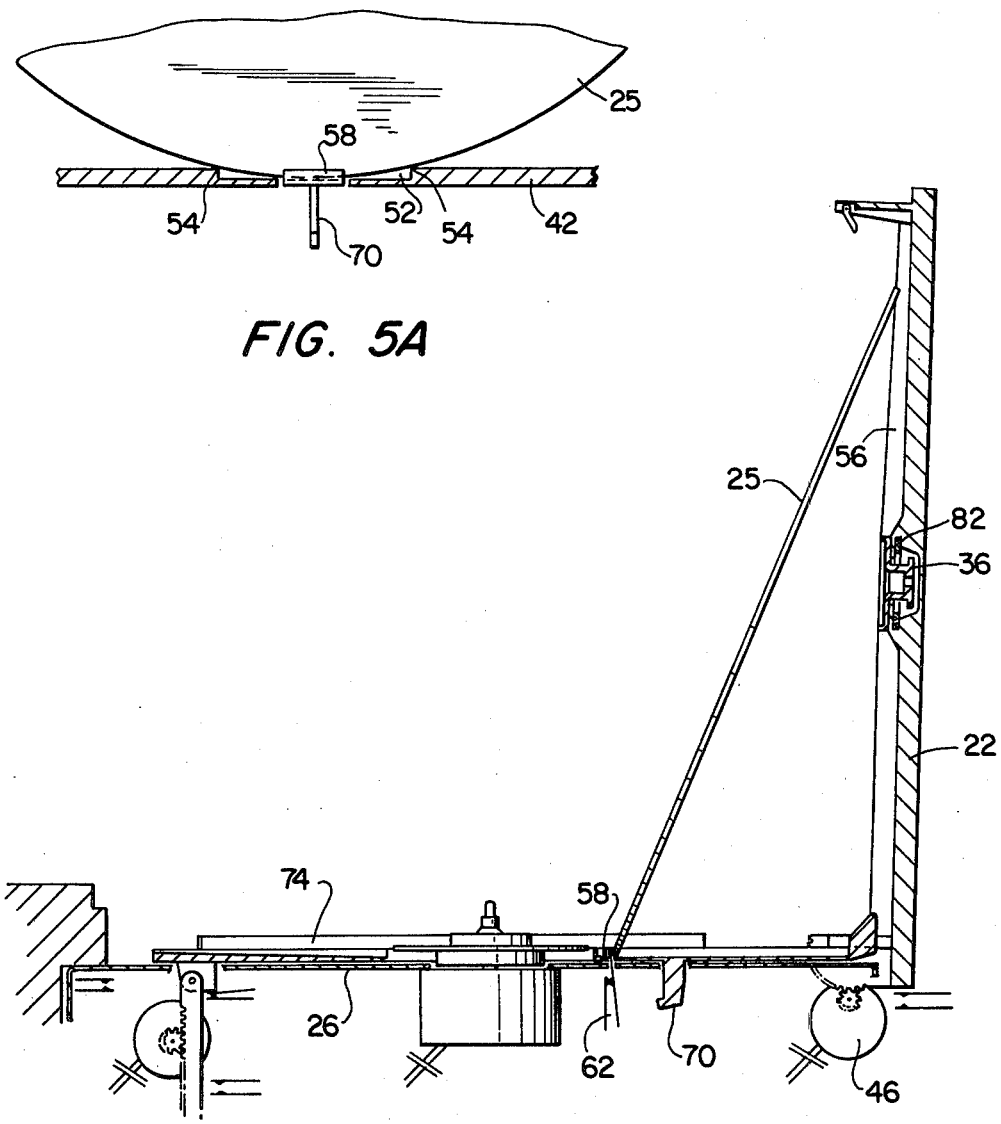

AUTOMATIC VIDEO DISC INVERTING MECHANISM

TECHNICAL FIELD

The present invention relates to video disc player apparatus and, more particularly, to mechanism incorporated in such apparatus for automatically turning over double-faced video discs of the type having information digitally recorded in grooves on the faces of the discs so that the faces or "sides" of the discs are played in succession without having to manually turn them over.

BACKGROUND ART

Video disc player apparatus are known of the type having a hinged cover adapted to be opened and closed to permit a video disc to be inserted and placed on a rotary drive for the video disc or removal therefrom. The cover is provided for protection, while the disc is rotated at high speed, and the cover may be locked against opening by a mechanism for as long as the disc is rotated. In addition to protection, the cover is also useful to prevent the penetration of dust when the apparatus is in the non-operational position.

In such video disc player apparatus where the device which carries out reading of the information carried by the disc operates only on one side of the disc, it is necessary to turn the disc over manually in order to read information from its other side.

Although manual turning over a record is acceptable in the case of audio apparatus (i.e., record players) handling of video discs raises several serious drawbacks. When a video disc is handled, the surface becomes contaminated by human perspiration and dirt which sticks due to the presence of the perspiration and such contamination interferes with the reading process. The surface of video discs is more susceptible to damage than conventional records. It also appears that the attention of a viewer of a video screen becomes very rapt and the interruption required to manually turn over a disc is very objectionable. As turning over the disc requires the viewer to open the cover, turn the disc, close the cover and restart the apparatus, and as this sequence of operations takes time, it may be readily understood that video players having provision for manually turning over discs have only had very limited success with the public.

Devices for automatically turning over a disc are known which include a mechanism for grasping the disc by the opposite circumferential edges and revolving the disc in space to turn it over. Another type of mechanism is known which has an annular pan for grasping a disc, lifting it from a turntable and, in cooperation with a reversing member, turning the disc over and returning it to the turntable.

These known devices are complex in construction and involve large extraneous members to grasp the disc and turn it over. Video disc players which have a protective cover provide more limited space beneath the cover than is required by these known devices for turning over discs, which heretofore have been applied to conventional record players having no severe space limitations.

DISCLOSURE OF INVENTION

The main object of this invention is to provide a device for automatically turning over a video disc which may be incorporated within the confines of the protective covers in existing video player apparatus, thus providing a completely automatic apparatus which fits within the same dimensions as the existing manual apparatus and requires no additional space.

A further object of the invention is to ensure that the action provided by the device is rapid, reliable and accurate in turning over the disc.

Still another object of the invention is to ensure that the handling which must be carried out by the operator, i.e., placing the disc in playing position in the apparatus and its removal, are considerably easier than with the manual apparatus at present available on the market.

Another object is to provide a device for automatically turning over a video disc in a video disc player apparatus which utilizes the movements of the protective cover normally provided in such apparatus to raise the disc from playing position and turn over the disc.

Another object of the invention is to ensure that the mechanism which carries out the automatic turning is simple to manufacture and include in video disc player apparatus, such that the retail price of this apparatus is only slightly increased.

A further object of the invention is to provide a device for automatically turning over a video disc in a video player apparatus in which the disc, when in playing position, is carried in a substantially vertical plane.

BRIEF DESCRIPTION OF THE DRAWINGS

Further objects will become apparent from the following description, taken in conjunction with the accompanying drawings, in which:

FIGS. 1 to 9 are diagrammatic stop-motion views of a preferred embodiment of the invention in a video disc player in which the disc, when played, is in a horizontal plane, showing different positions of the disc and the components during the operation of automatically turning over the disc;

FIGS. 4A and 5A are fragmentary cross sectional views taken essentially in the planes indicated by 4A and 5A in FIGS. 4 and 5, respectively;

BEST MODE FOR CARRYING OUT THE INVENTION

Figure 1:
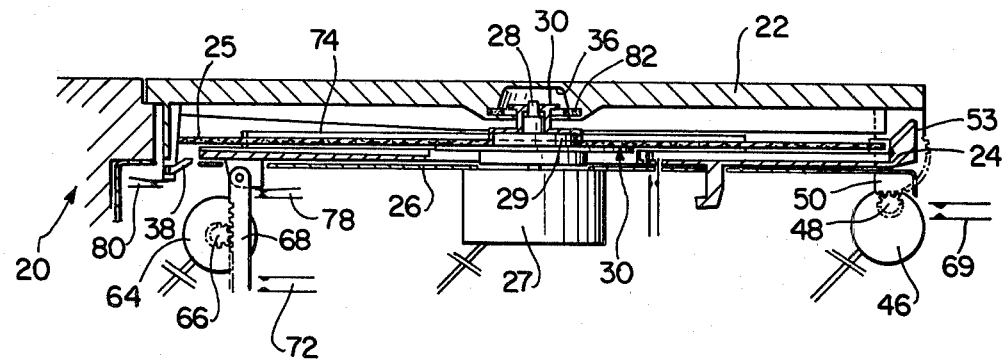

Turning now to the drawings, there is shown in FIGS. 1-10 a video disc player apparatus having a base 20 and a cover 22 hinged for pivotal movement about an axis 24 on the base 20 so as to be pivotable between a closed position shown in FIG. 1 and a completely open position shown in FIG. 5 in which a video disc 25 may be inserted in the apparatus. The apparatus includes a chassis 26 which is fixed to the base 20 and supports a motor 27 for rotating the video disc 25. The motor 27 has a shaft 28, hub 29 and rotor disc assembly 30 which serves as means for carrying and rotating the video disc 25, the shaft 28 and hub 29 being received in the center hole of the video disc 25. The video disc rotating means 30 operates in cooperation with an iron ring 34 which is mounted in a recess 36 on the underside of the cover 22 and functions as a pressure ring to clamp the video disc 25 to the rotor disc and hold it precisely for rotation in a plane aligned relative to a reading head (not shown) mounted to the chassis in position to scan the underface of the video disc. When the motor 28 is energized, the shaft, hub and rotor disc assembly 30, pressure ring 34 and video disc 25 are rotated as a composite unit.

The cover 22 is adapted to be opened to separate the pressure ring 34 from the rotor disc assembly 30 and permit a video disc to be inserted and placed on the rotor disc or removed therefrom. When closed, the cover 22 serves as a protective shroud around the video disc 25, which rotates at high speed (200-1800 RPM), in the operation of the video disc player apparatus.

Figure 2:
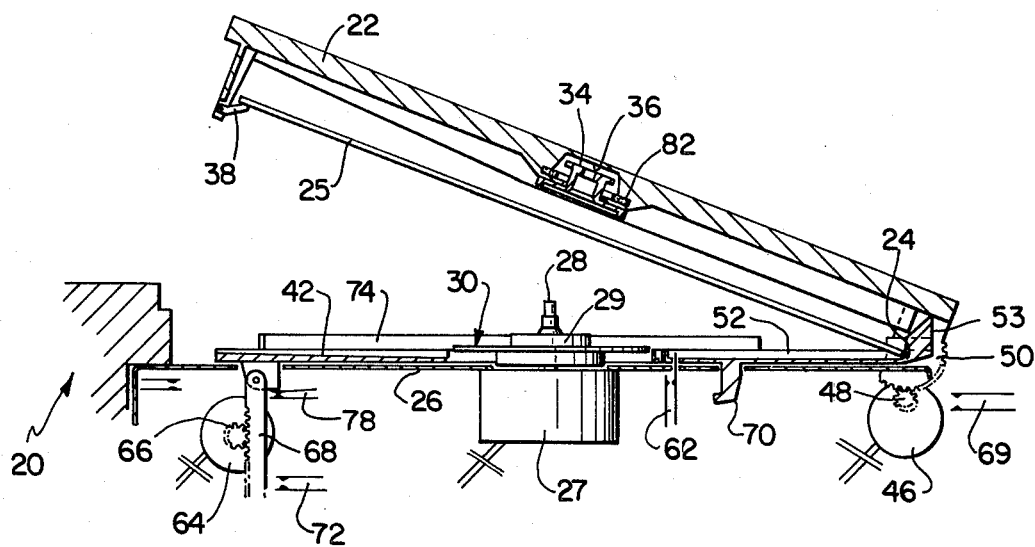

In accordance with the invention, included in the video disc player apparatus is a device for automatically turning over a video disc 25 carried by the rotor disc assembly 30 as an incident to opening and closing the cover 22. Thus, referring to FIGS. 1 and 2, mounted to the underside of the cover 22 is a catch 38 which, in the operational position of the apparatus shown in FIG. 1, is located beneath the video disc so as not to interfere with its operation. The catch 38 is provided to engage below one edge of a video disc 25 as the cover 22 is opened, as shown in FIG. 2, to pivot the video disc 25 about its diametrically opposite edge as the cover 22 is raised. In keeping with the present invention, turning over the video disc 25 includes a ninety degree phase in which the video disc pivots about a portion of its bottom edge between substantially horizontal and vertical positions, shown in FIGS. 1 and 3 respectively, and a ninety degree phase in which the video disc 25 slides under its own weight between substantially vertical and horizontal positions while the bottom edge of the video disc 25 slides laterally, shown in successive stop-motion views in FIGS. 3-7.

Figure 15:
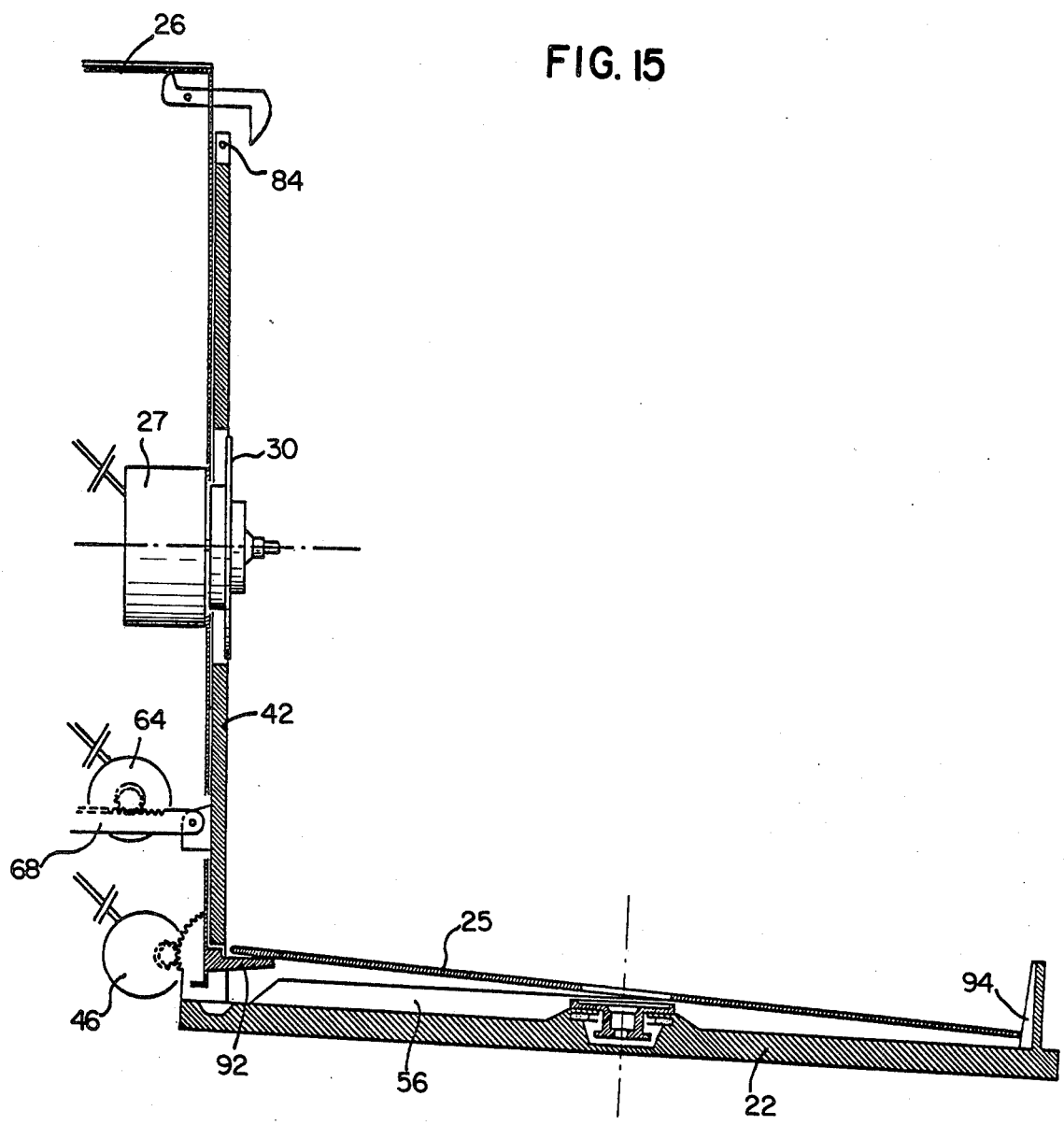
Figure 16:
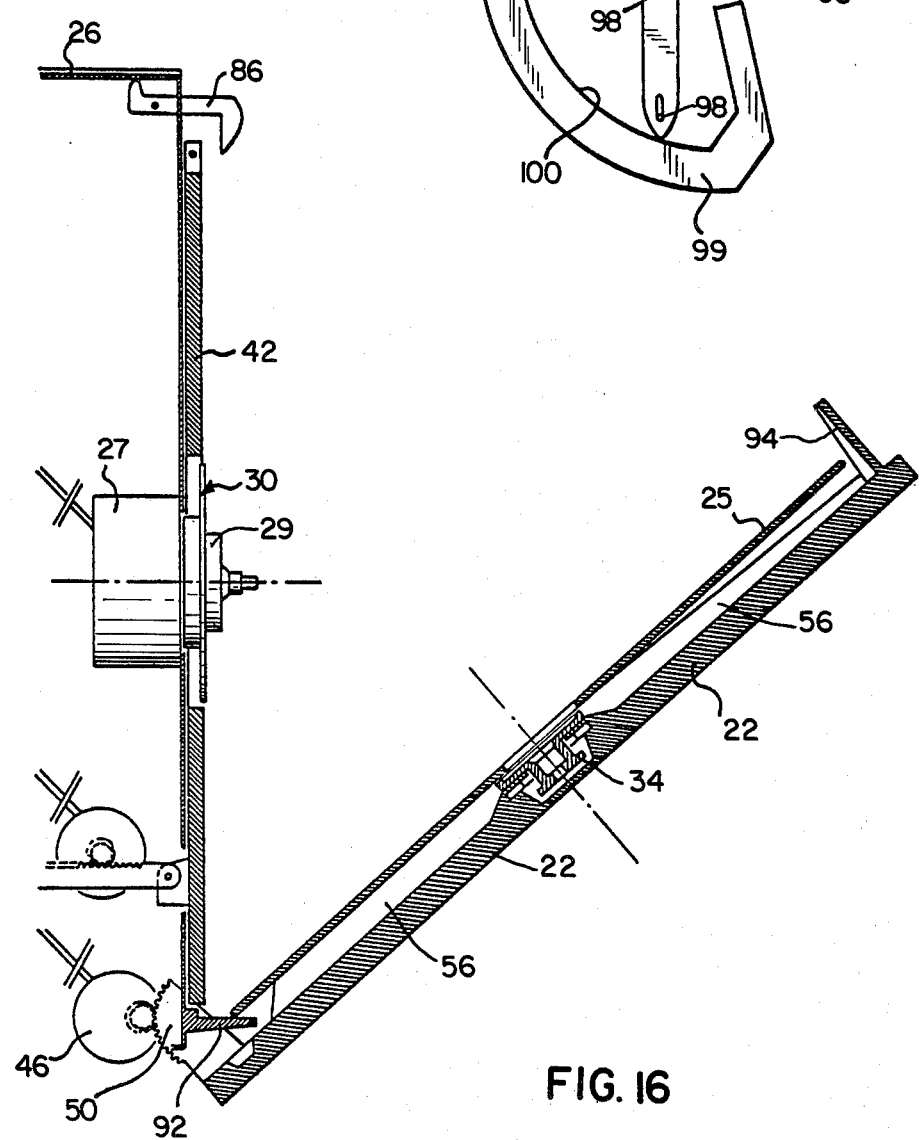

As a further embodiment, the present invention is applied to video disc player apparatus in which the video disc is carried and rotated in a vertical plane during operation. Thus, while in FIG. 1 the video disc is horizontal during operation, referring to FIGS. 11-17, a video disc player apparatus is shown in which the video disc 25 is vertical during operation. In carrying out this aspect of the invention, the video player apparatus shown in FIG. 11 includes a rotor disc assembly 40 for supporting and rotating a video disc in a vertical plane, and a device for automatically turning over a video disc carried on the rotor disc assembly 40. Turning over the video disc, in this further embodiment of the invention, as in the first embodiment, includes a ninety degree phase in which the video disc pivots about its bottom edge between substantially horizontal and vertical positions (FIGS. 15-16). In this further embodiment, the "pivoting" phase takes place during return of the video disc to the supporting and rotating means and during this "pivoting" phase the turning over of the video disc is being completed. In the first embodiment of the invention shown in FIGS. 1-10, the "pivoting" phase takes place during the removal of the video disc from the supporting and rotating means, which is the start of the turning over operation. Likewise, the "sliding" phases are reversed in the two disclosed embodiments of the invention. In this further embodiment of the invention shown in FIGS. 11-17, the disc 25 slides under its own weight between substantially vertical and horizontal positions (FIGS. 11-14) to start the turning over operation while in the first embodiment of the invention (FIGS. 1-10), the disc slides under its own weight between substantially vertical and horizontal positions to complete the turning over operation.

In both forms of the invention, turning over the disc 25 includes a ninety degree phase in which the disc slides under its own weight and a ninety degree phase in which the disc pivots about the bottom edge. In both forms of the invention, a back plate 42 is movably supported by the chassis 26 beneath the video disc 25 and means associated with the cover 22 and the plate 42 are provided for engaging and turning over the disc 25.

Turning over the disc is carried out completely automatically and under power, selectively under the direction of the user or when the end of the reading operation of one side of a video disc is reached. In both forms of the invention, the drive motor 27 is braked so as to stop the rotation of the video disc 25 and a safety device or interlock is actuated when the disc has stopped rotating, which authorizes unlocking of the cover solely when the disc is stationary. While various circuit means may be employed, pulses generated representative of the speed of rotation of the motor may be sensed and applied to the input of a servo circuit representing, when the pulse stream stops, the stopping of the disc to enable opening of the cover.

Figure 10:
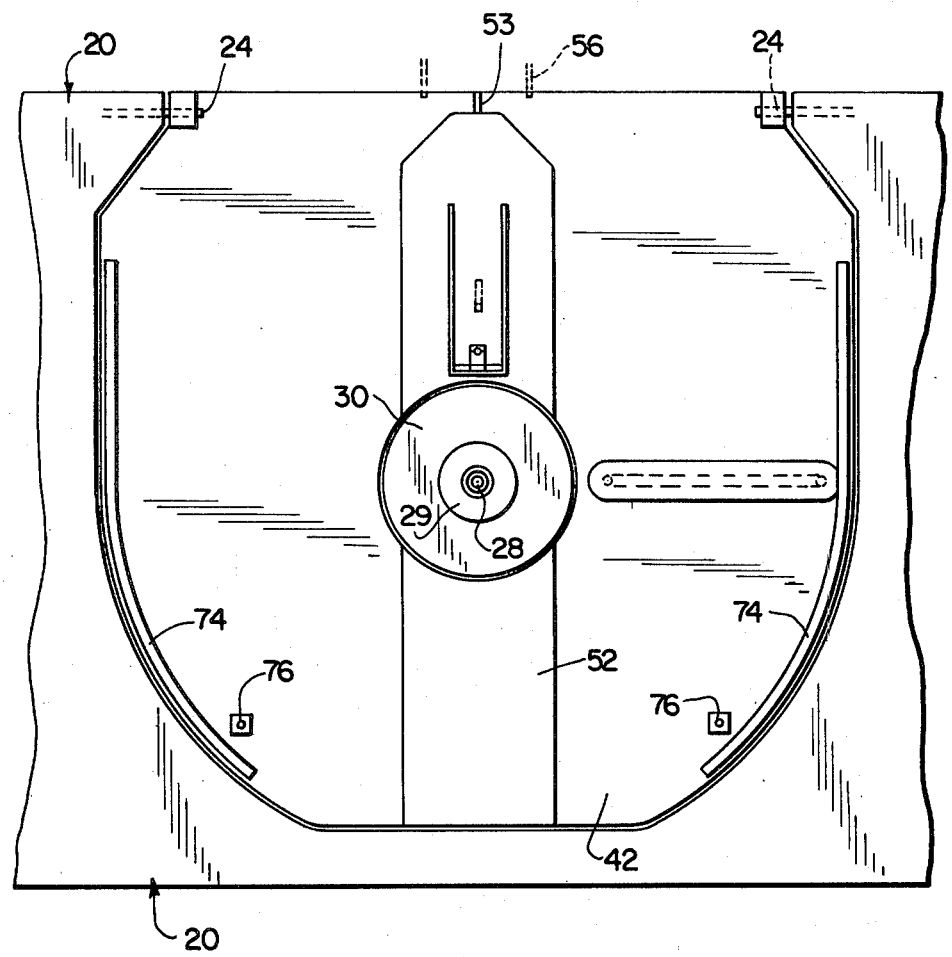
FIG. 10 is a plan view of the back plate component of the device shown in FIGS. 1-9.

Turning again to the first embodiment of the invention shown in FIGS. 1-10, to open the cover 22, as shown in FIG. 2 a motor 46 is mounted on the chassis 26 having a drive gear 48 which meshes with a gear segment 50 fixed to the cover 22. Upon operation of the motor 46, the cover is pivoted about its axis 24 with the catch 38 engaging a video disc 25 on the rotor disc assembly 30, the video disc is pivoted about a portion of its bottom edge, as shown in FIG. 2, and raised toward a vertical position. During its pivotal clockwise movement, the bottom edge of the disc 25 abuts a stop 53 which provides a notch in which the bottom edge of the video disc 25 is received. The stop 53 is mounted on the back plate 42 and extends from the edge of the plate, as seen in FIG. 10, to the end of a shallow wide guide groove 52 formed in the surface of the plate. Referring to FIG. 5A, which is a cross sectional view of the back plate 42 taken in the mid portion of the guide groove 52, the configuration of the guide groove 52 at that location shows that it extends substantially into the back plate 42 and has well defined lateral edges, the proportions of the width and depth of the guide groove 52 being such that the edge of a video disc 25 resting vertically on the back plate 42 will extend into the guide groove 52 so that the bottom most portion of the edge of the video disc 25 rests on the bottom of the groove 52 and the corners 54 at the groove edges engage the edge of the video disc. As shown in FIG. 10, the groove 52 narrows towards one end where the stop 53 is located and with this arrangement in the initial stage of its pivotal movement the bottom edge of the video disc 25 abuts the stop 53 and extends into the end of the guide groove 52 where the stop 53 forms a notch.

Figure 3:
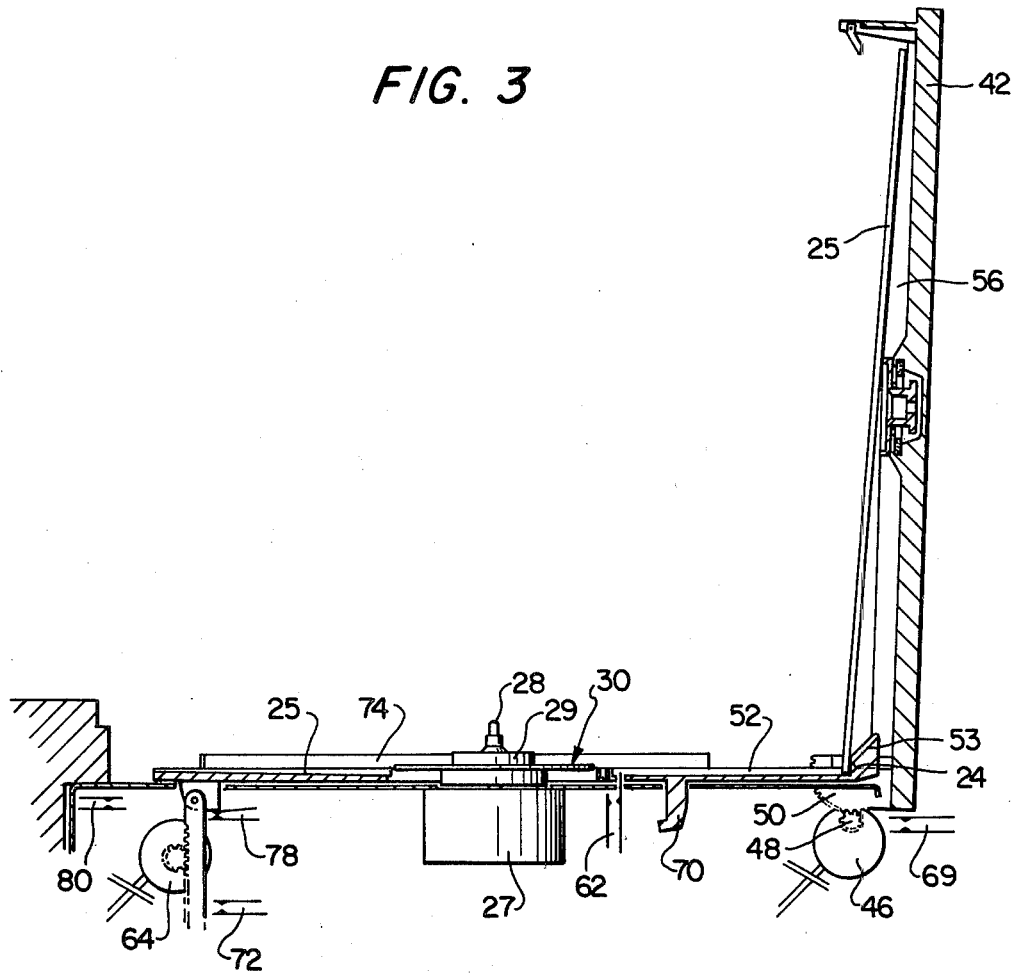

In the operation of turning over the video disc 25 under the power of the drive motor 46 for the cover 22, the cover 22 is raised to a substantially vertical position, shown in FIG. 3, in which the video disc 25 has been carried past the vertical plane and slightly over center. In the final stages of the "pivotal" phase of movement of the cover 22 clockwise, it will be seen from FIG. 3 that the bottom edge of the video disc 25 is pivoted out of the restraining notch between the stop 53 and the back plate 42 and begins to slide laterally; the face of the stop 53 which engages the video disc in the final stages of movement of cover 22 starts the bottom of the video disc sliding (toward the left in FIG. 3) to cause the disc to enter a "sliding" phase of movement to complete the turning over operation. Referring to FIG. 10, the end of the groove 52 in the backing plate 42 is tapered so that as the disc 25 begins its sliding movement from the position of FIG. 3 to the position of FIG. 4, the corners of the tapered portions of the guide groove 52 engage the bottom edge of the video disc, restrain it against sidewise movement, and guide the disc 25 in its sliding movement so as to maintain the disc perfectly centered over the backing plate 42. Similarly, the underside of the cover 22 is provided with a pair of parallel raised elements 56 (FIG. 4A) which form a track or guide which engages the top edge of the disc 25 as it slides laterally and, while sliding, rotates in space generally in a clockwise direction.

Figure 6A:
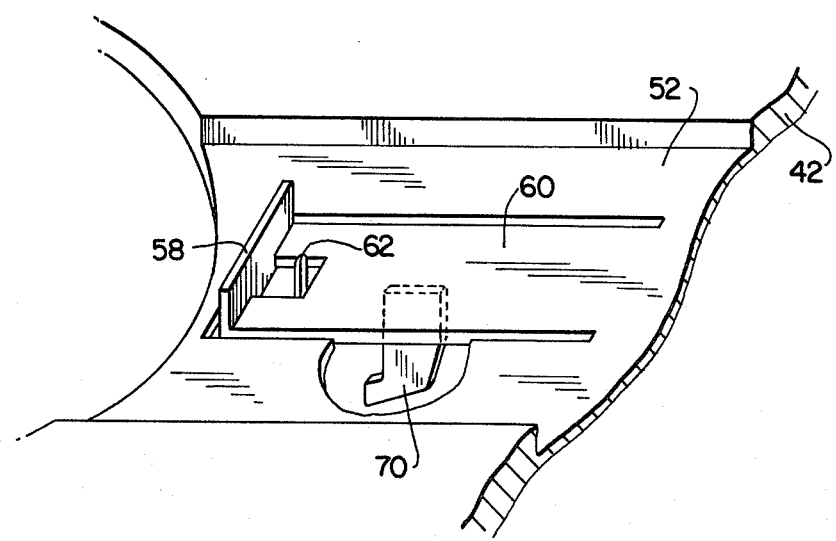
FIG. 6A is a fragmentary perspective view of the back plate.
Figure 6:
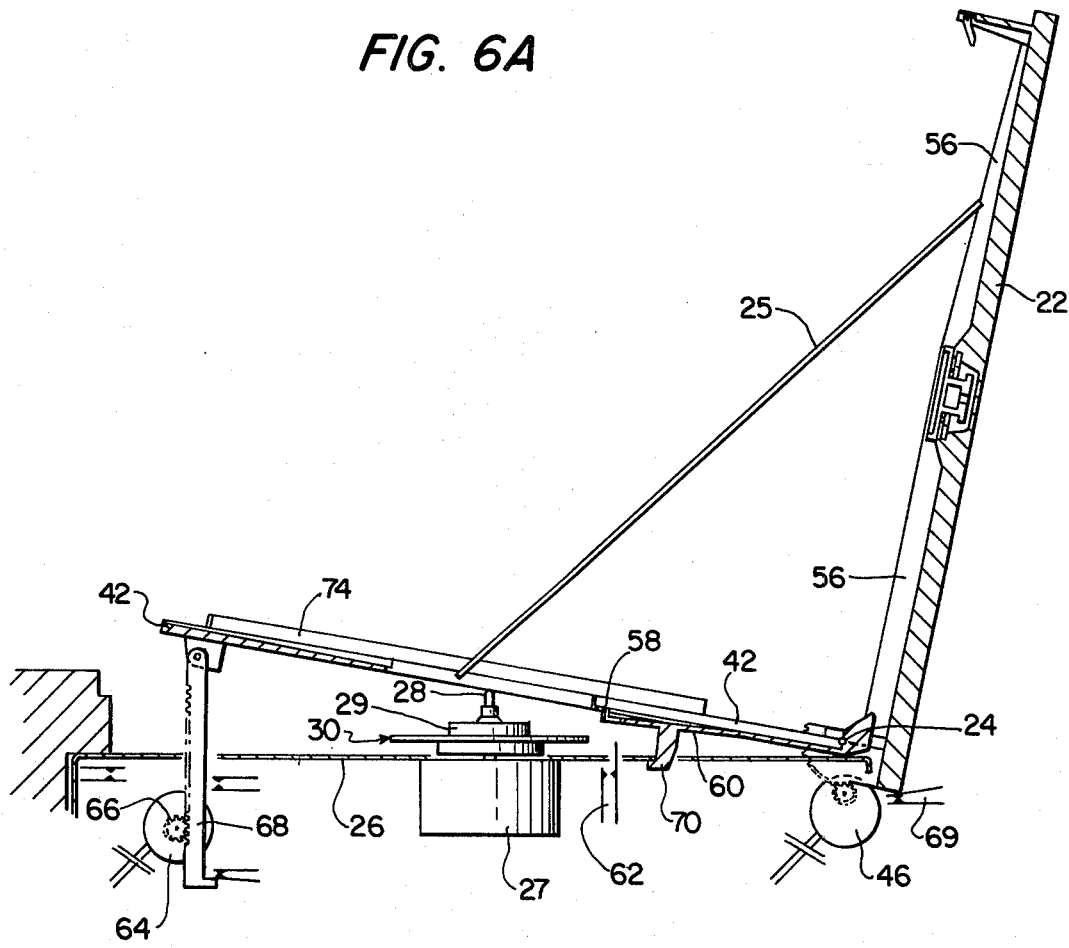

The disc 25 slides under its own weight during this sliding phase between the substantially vertical position of FIG. 3 and a final horizontal position as shown in FIG. 1. To avoid interference with the rotor disc assembly 30 during the course of this sliding phase, the back plate 42 is elevated to carry the bottom edge of the video disc past the assembly 30. To this end, a stop 58 is mounted on the surface of the back plate 42 located in the groove 52 on the surface of the plate, as seen in FIG. 5A. According to this aspect of the invention, the stop 58 is supported on a tongue 60 (FIG. 6A) integral with the backing plate 42, the plate 42 being preferably molded plastic similar to the cover 22 so that the tongue is flexible. For both the cover 22 and plate 42, a plastic or other material is utilized having a finish which provides a low coefficient of friction relative to the disc 25 so that the disc slides smoothly in this phase of its turning over operation. In addition to the stop 58, the back plate 42 is also provided with a stop switch 62 which is engaged by the bottom edge of the video disc 25 as it comes into contact with the stop 58 (FIG. 5). Closing the stop switch 62 results in energizing a drive motor 64 for elevating the back plate 42 via pinion 66 and rack 68. Referring to FIG. 6, when the drive motor 64 is energized, the back plate 42 is pivoted clockwise.

During rotation of the back plate 42, the cover 22 continues to open until it actuates the switch 69 and has an angle which facilitates the descent of the disc. In the course of elevating the back plate 42, a finger 70 (FIG. 6A) fastened to the underside of the tongue 60 comes into engagement with the chassis 26 such that continued movement of the back plate results in the tongue 60 being bent down relatively to the main body of the back plate 42 (FIG. 6) to lower the stop 58 below the surface of the back plate 42 and remove the stop from its position against the bottom edge of the video disc 25. The elevation of the back plate 42 is terminated by the action of a stop switch 72 engaged by the rack 68, which serves to de-energize the back plate drive motor 64. As illustrated in FIG. 6, the back plate 42 is stopped in an inclined position and the video disc 25 is released to continue its sliding movement under its own weight by the removal of the stop 58 from against the bottom edge of the video disc 25. The maximum elevation of the back plate 42 is such that the bottom edge of the video disc 25 clears the rotor disc assembly 30 as it slides along the surface of the back plate so that the video disc is allowed to complete its turning over movement. It is preferred to pivot the back plate 42 clockwise to elevate the back plate, although it could be mounted for pivotal movement in a counterclockwise direction. The video disc slides less quickly when the back plate 42 is inclined, as shown, facing the video disc, which is preferred, and the closing of the cover 22 may begin without delay for the complete return of the back plate 42 to speed the cycle of operation.

Figure 7:
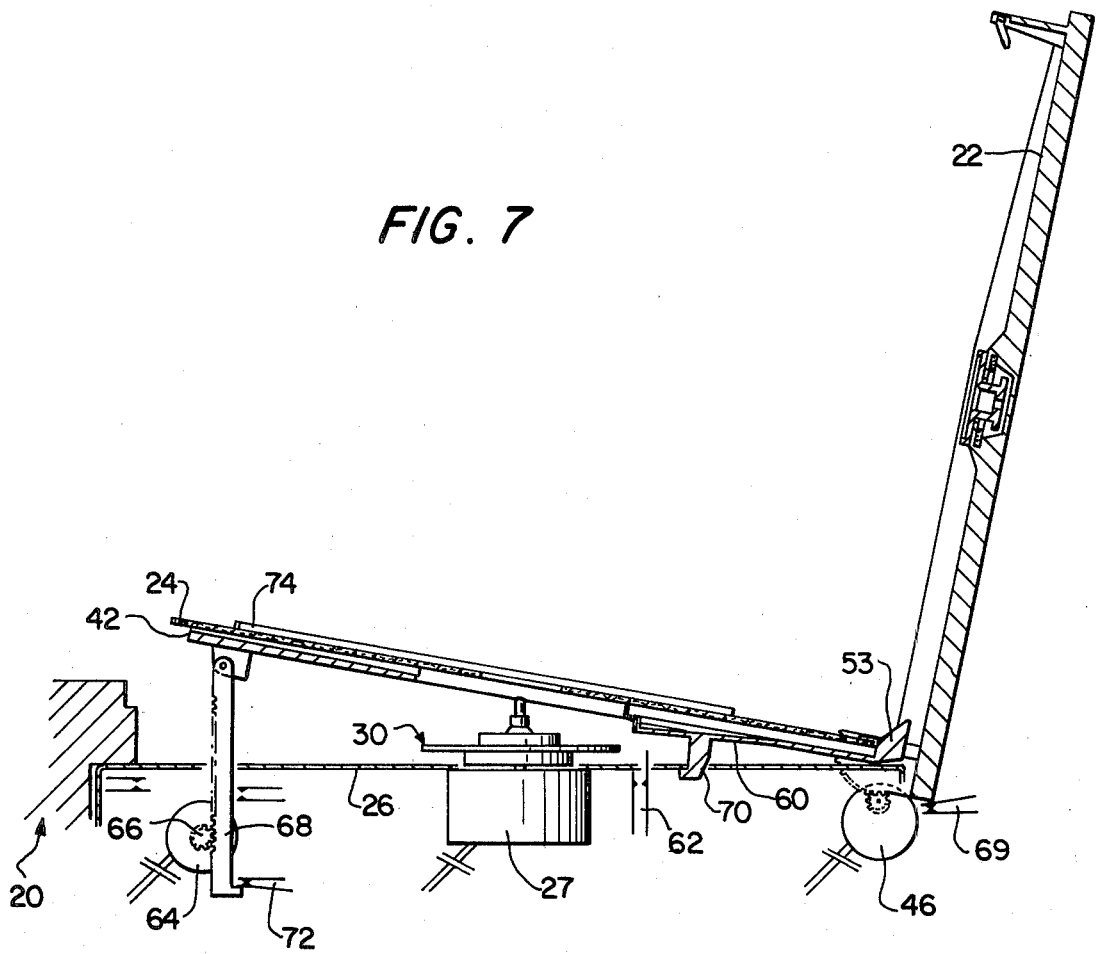
Figure 8:
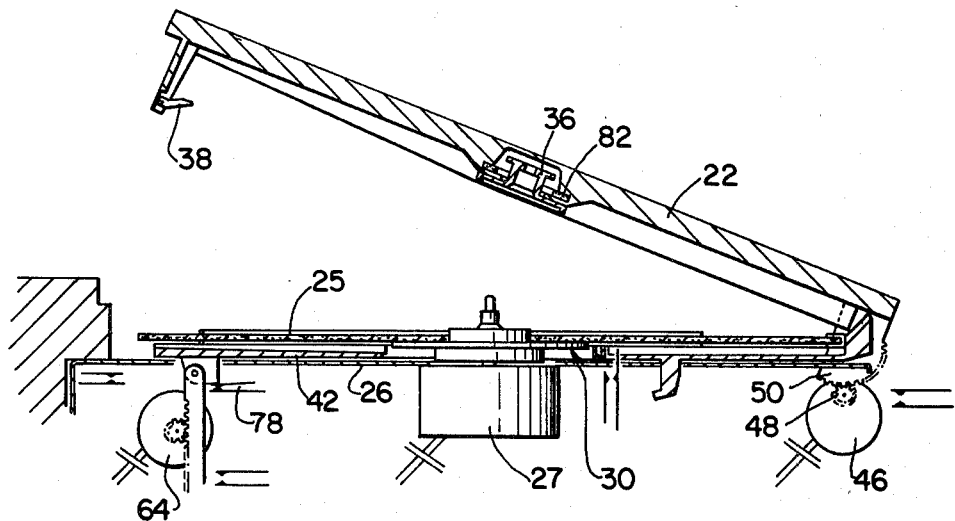
Figure 9:
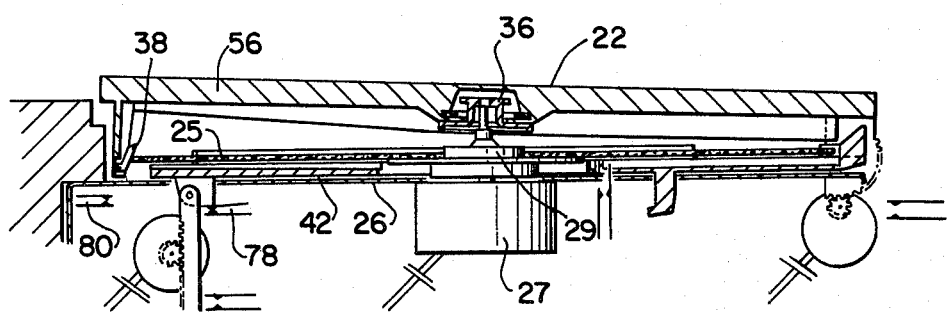

In the course of the sliding movement of the video disc 25 toward its horizontal position, which is shown in FIG. 8, both the top edge of the disc and the bottom edge of disc are guided by the guide means 52, 56 for the disc 25 on the back plate 42 and the underside of the cover 22, respectively. The video disc 25 comes to rest on the back plate 42, as shown in FIG. 7, while the back plate 42 is elevated, the back plate 42, having curved, raised elements 74 extending above the surface of the plate, as indicated in FIG. 10, which conform to the periphery of the video disc 25. The video disc 25 thus slides laterally until it abuts against the curved elements on the surface of the back plate 42 which assist in centering the disc 25 on the back plate in alignment with the hub 29 and rotor disc assembly 30 of the video disc drive motor 28.

The circular elements 74 on the back plate 42 and located as abutments to center the video disc at the end of the automatic turning operation advantageously further act as a damping device for the video disc 25. When the disc 25 reaches a position forming a slight angle with the back plate 42, the air located between the video disc 25 and the plate 42 is slightly compressed as the height of the raised circular elements 74 restricts its escape. As a result of this, the positioning of the video disc 25 on the back plate 42 takes place gently. In order to further improve this shock-absorbing effect, the back plate 42 may be provided with a light rubber covering.

When the video disc comes to rest against the back plate 42 while the back plate is elevated above the chassis 26, as indicated in FIG. 7, the video disc 25 engages sensing means, herein shown as a pair of sensors 76 on the surface of the back plate 42. In response to actuation of these sensors 76, the back plate drive motor 64 is energized to operate via the pinion 66 and rack 68 to lower the back plate 42 to its substantially final horizontal position indicated in FIG. 8 and the cover drive motor 46 is energized to rotate the cover 22 counterclockwise from the position of FIG. 7, through the intermediate position of FIG. 8, to the final operational position of FIG. 1. In the course of the counterclockwise movement of the back plate 42 from the position of FIG. 7 to the position of FIG. 8, the video disc 25 is carried onto the rotor disc assembly 30 and the hub and shaft enter the hole in the video disc to center the video disc on the rotor disc assembly 30.

The completion of the movement of the back plate 42 to its final horizontal position is sensed by means herein shown as a stop switch 78 as indicated in FIG. 8. In the course of the final movement of the cover 22, it will be seen from FIG. 9 that the catch 38, which is pivotally supported on the cover 22, is swung counterclockwise to allow the catch 38 to move past the video disc 25 and reach its final position beneath the disc, which is indicated in FIG. 1. The final movement of the cover 22 also results in a stop switch 80 being closed (FIG. 1) which signals that the turning over has been completed and the video disc 25 is in the operational position.

During the sliding movement of the video disc (FIGS. 5-7), the top edge of the video disc 25 is guided by the straight raised guide members 56 (FIG. 4A) on the underside of the cover 22. To prevent interference in the course of this sliding movement between the top edge of the video disc and the pressure ring 34 housed within the cover 22, the pressure ring 34 is retracted into the cover 22. In accordance with this feature of the invention, the pressure ring 34, which is an iron ring, is retracted and latched by a fixed annular latching magnet 82 mounted in the cover 22. Only sufficient force is exerted by this latching magnet 82 to overcome the force of gravity acting on the pressure ring 34 and to latch the pressure ring in a fully retracted position, free and clear of the video disc 25. A much stronger magnet is used as a clamping magnet in the hub 29 of the rotor disc assembly 30, which is operative to draw the pressure ring 34 into operational position and clamp the video disc. The force exerted by the drive motor 28 for the cover 22 to raise the cover is desirably sufficient to separate the pressure ring 36 from the retractive magnetic force exerted by the clamping magnet whether a video disc is present or not. If desired, the back plate 42 may also be operated by its drive motor 64 to assist in raising the cover 22 when no video disc is in place. The downward force due to the magnetic attraction of the iron pressure ring 34 by the magnet in the hub 29 of the rotor disc assembly 30 may be overcome with a smaller drive motor 46 for the cover when the power from both motors is used.

In present manual video disc player apparatus, such as available presently on the market, the user must place the video disc on the rotor disc in the playing position, and manually remove it from the rotor disc. As the level of the rotor disc 30 is very close to the chassis 26, there is only a slight clearance between the periphery of a video disc on the rotor and the chassis 26, making it difficult to grip the edge of the video disc with the fingers for removing the video disc.

In order to overcome this problem, in accordance with a further aspect of the invention, a cycle of operation may be provided to facilitate insertion in or removal of a video disc from the apparatus. Accordingly, the cover 22 is opened by the operation of the cover drive motor 46 until the cover 22 reaches the position shown in FIG. 5 and the video disc 25 occupies an intermediate inclined position, also shown in FIG. 5. In this case, the stop switch 62 may be utilized to sense this intermediate position of the video disc and to stop the operation of the drive motor 46 to hold the disc in that position. It can be seen that the removal of the disc 25 is a simple operation as it is possible to grip the disc 25 by its center aperture or by its periphery to remove the disc from the apparatus and to insert another disc into the apparatus. Following the insertion of a video disc, the cover drive motor 46 is operated to close the cover 22 which automatically places the video disc 25 on the rotor disc 30 in playing position. If no video disc 25 has been inserted, the cover 22 is simply closed by operation of the drive motor 46.

Turning now to FIGS. 11–16, this further embodiment of the invention is applied to a video disc player apparatus in which the video disc 25 is rotated in a vertical plane during operation. As above noted, in turning over the video disc, the video disc is first revolved through a ninety degree phase in which the video disc slides under its own weight between a substantially vertical operational position and a horizontal position while the bottom edge of the disc slides laterally, and a subsequent ninety degree phase in which the disc pivots about the bottom edge and in which it is returned to the initial substantially vertical position for operation.

Figure 11:
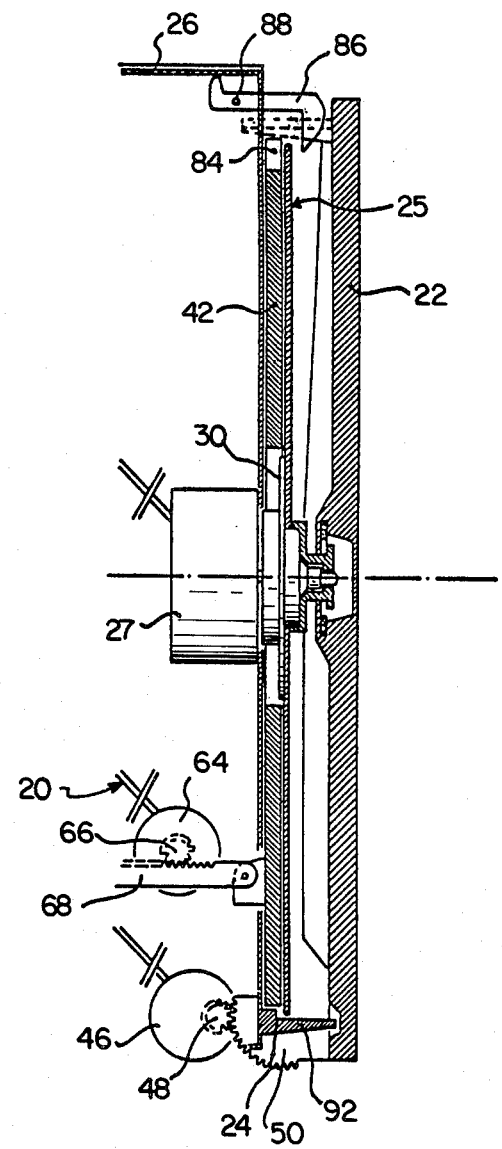
FIGS. 11 to 16 are diagrammatic stop-motion views of an alternative embodiment of the invention in a video disc player in which the disc, when played, is in a vertical plane, showing different positions of the disc and the components during the operation of automatically turning over the disc.

To this end, the video disc player apparatus embodies, as in the case of the embodiment of FIGS. 1–10, a chassis 26 on which is mounted a video disc drive motor 27 having a rotor disc assembly 30 for supporting and rotating the video disc 25. The chassis 26 is supported on a base 20 on which a cover 22 is hinged for pivotal movement about an axis 24 located at the lower end of the base 20 as shown in FIG. 11. The base 20 also supports, for pivotal movement about an axis 84 at the upper end of the base, a back plate 42 which is located beneath a video disc 25 carried on the rotor disc assembly 30.

In carrying out the invention, for pivoting the back plate 42 to start the video disc sliding through ninety degrees, a drive motor 64 is provided having a pinion 66 and rack 68 to pivot the back plate 42 by power. For pivoting the cover 22 to pivot the video disc 25 through a ninety degree phase, a separate drive motor 46 is provided having a drive pinion 48 meshing with a gear segment 50 connected to the cover 22. To prevent the video disc 25 from falling outward and accidentally slipping from the player apparatus as the cover 22 is initially opened, a finger 86 is pivotally mounted on a pin 88 carried by the chassis 26 adjacent the top edge of the video disc, having a hook 90 adjacent the end of the finger 86 which is located to be engaged by the top edge of the video disc 25 in the event the disc starts to fall away from the back plate 42 when the cover 22 is initially opened.

Figure 12:
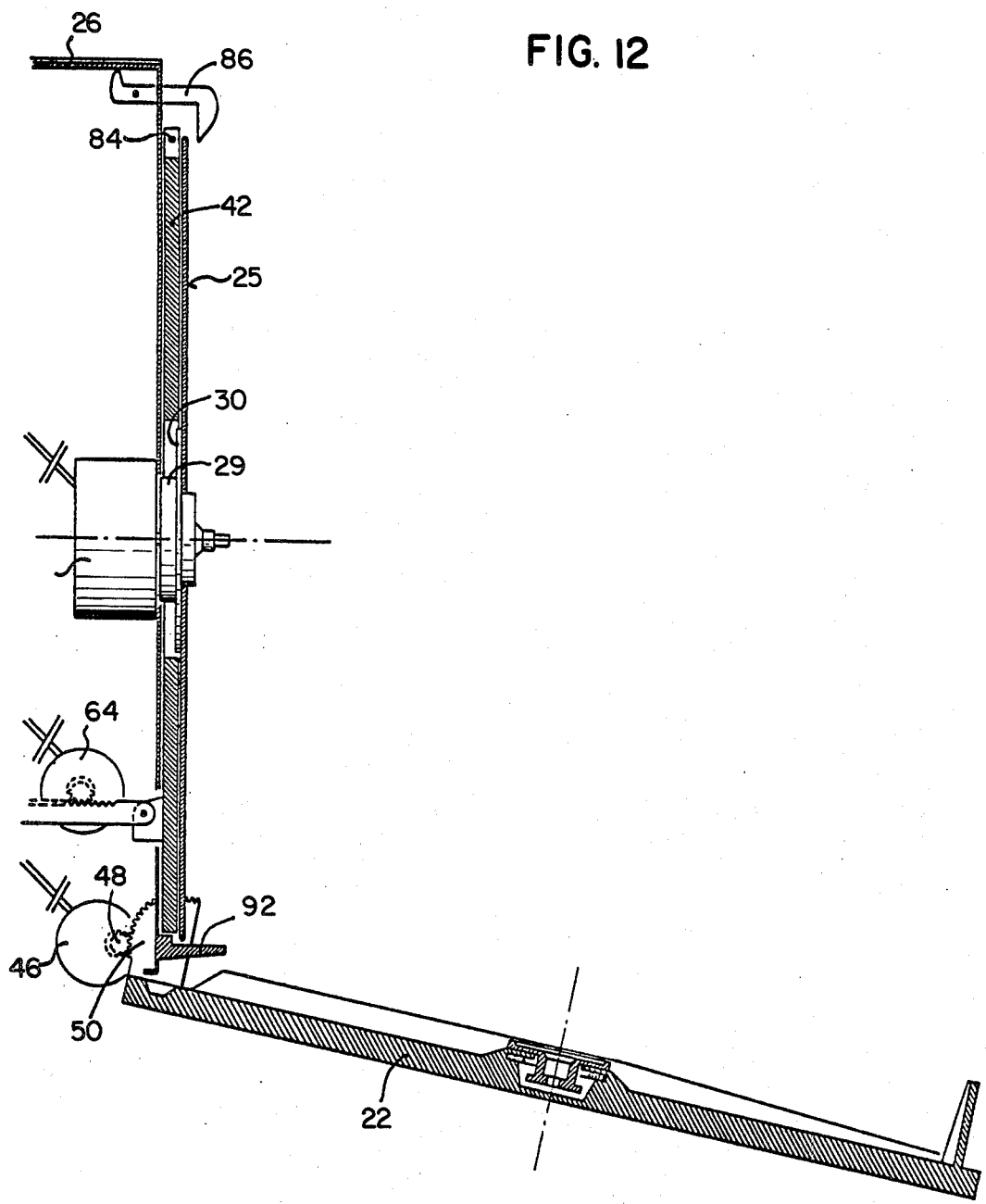
Figure 13:
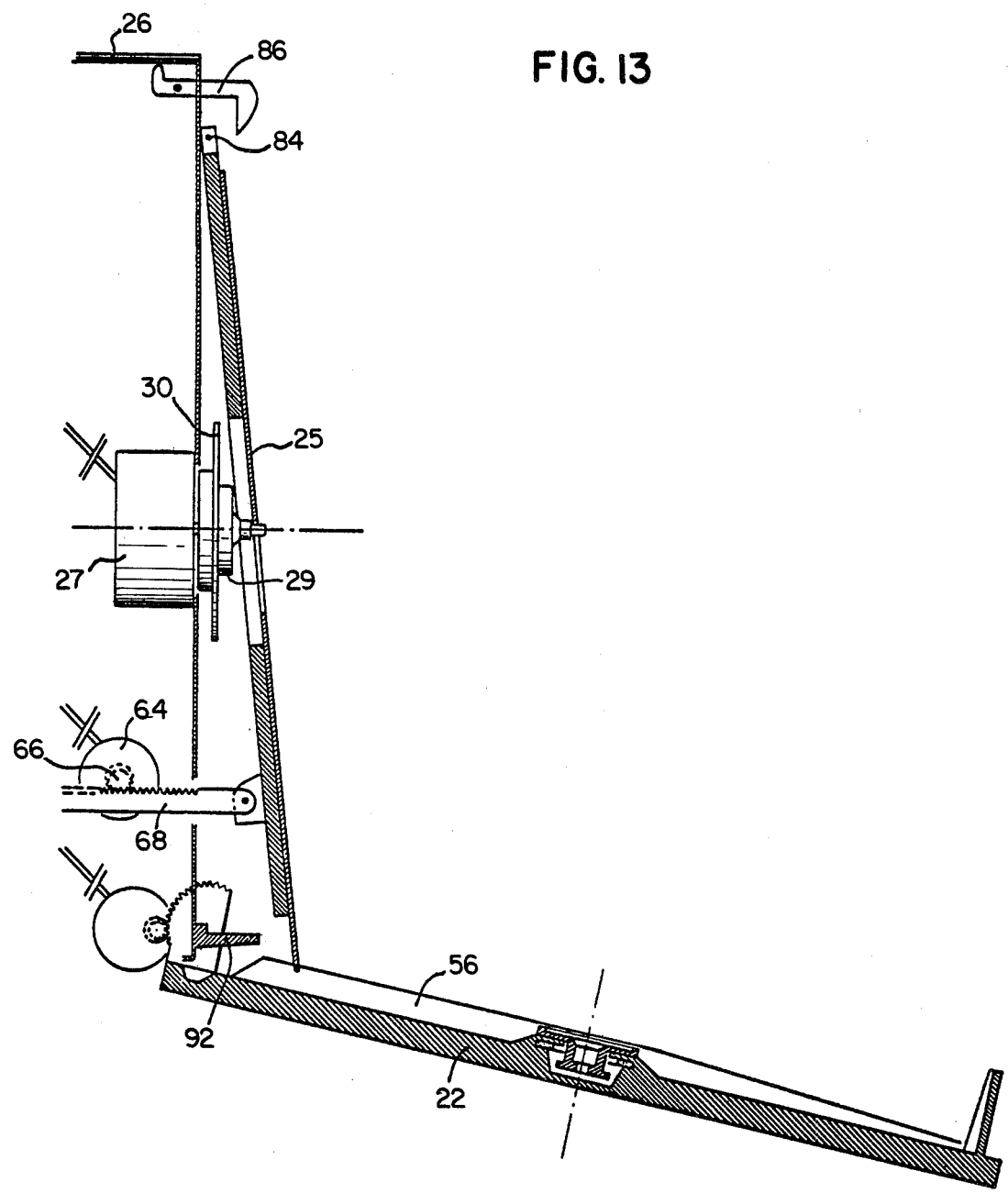

This embodiment of the invention also provides for automatically turning over the video disc as an incident to opening and closing the cover 22. To that end, following the reading operation, the drive motor 27 for the video disc 25 is braked to a stop and the drive motor 46 for the cover 22 is started to open the cover 22, by pivoting it clockwise via the pinion 48 and gear segment 50. When the cover 22 is completely open, as shown in FIG. 12, to start turning over the video disc 25, the drive motor 64 for the back plate 42 is energized to pivot the back plate counterclockwise. The back plate 42 shifts the video disc such that the center hole slides off the hub 29 of the rotor disc assembly 30 and the bottom edge of the video disc 25 slides along the ledge provided by a finger 92 projecting from the chassis 26 and finally drops, as shown in FIG. 13, to guides 56 on the underside of the cover 22. Such guides 56 on the underside of the cover 22 are provided in the form of parallel raised elements, similar to the guide elements illustrated in FIG. 4, and engage the edge of the video disc, both holding it against sidewise movement and maintaining the video disc against tilting movement as it slides under its own weight from the back plate 42 toward a substantially horizontal position, resting on the underside of the cover 22 in the form of the invention shown in FIG. 15. In the course of sliding movement of the video disc 25, the back plate 42 is moved away from the chassis 26 to an angular position, shown in FIG. 14, in which the plane of the back plate 42 is located to clear the end of the motor shaft 28 and rotor disc assembly 30 and thereby prevent interference between the top edge of the video disc 25 and the end of the motor shaft 28 as the disc slides towards the horizontal position. The bottom edge of the video disc 25 comes to rest against a stop 94 on the cover 22, which arrests the sliding movement of the video disc. The back plate 42 is subsequently pivoted clockwise and returned against the chassis 26, as shown in FIG. 15, which permits the video disc 25 to fall and complete its sliding movement under its own weight to the substantially horizontal position shown in FIG. 15 in which the video disc rests on the underside of the cover 22 and the finger 92 extending laterally from the chassis 26 supports one edge portion of the video disc. The rest position of the video disc, as shown in FIG. 15, may be sensed by any conventional means.

Once the video disc 25 has reached the rest position of FIG. 15, the drive motor 46 for the cover 22 is energized to swing the cover 22 counterclockwise to close the cover. As shown in FIG. 16, movement of the cover 22 is utilized to pivot the video disc 25 about the bottom edge which rests on the finger 92 extending laterally from the chassis 26. Preferably, the stop 94 and guides 56 on the underside of the cover 22 cooperate to engage the video disc and prevent its sidewise movement and help maintain the alignment of the video disc as it completes its turning movement. In the final stage of the counterclockwise rotating movement of the cover 22, the video disc 25 is slid onto the hub 29 of the rotor disc assembly 30 and the pressure ring 34 is engaged to clamp the video disc for operation.

The pressure ring 34, in the further embodiment of the invention described in FIGS. 11–16, is acted on by gravity to retract within the cover 22 and be clear from engagement by the edge of the disc as is slides in the course of its revolving movement.

Figure 17:
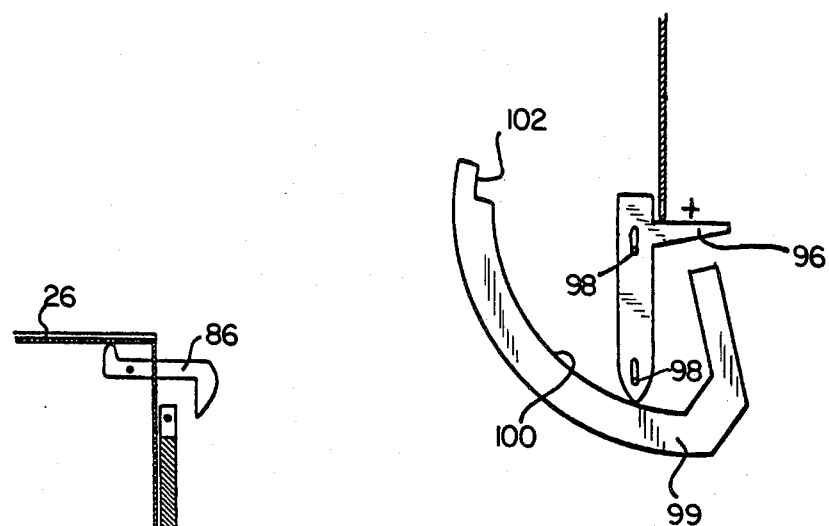
FIG. 17 is a diagrammatic view of a modification in the support means for the disc during its pivotal movement in the embodiment shown in FIGS. 11-16.

As a further improvement, to assist in the centering of the video disc 25 and placing it on the rotor disc assembly 30 as the device completes the operation of turning over the video disc, the fixed finger 92 on which the disc rests during its pivotal phase of movement and which is supported on the chassis 26, is replaced by a movable finger 96, herein shown diagrammatically in FIG. 17. The movable finger 96 is mounted on two pins 98 that fit in slots in the finger 96 so that it is vertically movable relative to the chassis 26. An arcuate cam member 99 is fixed to the cover for movement with the cover and provides a cam surface 100 that engages the tapered lower end of the finger 96, which follows the movement of the cam surface 100. The cam surface 100 is configured so that the video disc 25 is raised to be centered on the rotor disc assembly 30 as the disc 25 completes its pivotal movement toward the back plate 42 to facilitate placing the video disc 25 with the center hole of the disc on the hub 29 of the assembly 30. In the course of the final movement of the cover 22 as the cover is closed, the pressure ringe 34 is attracted by a magnet within the hub to clamp the video disc on the rotor disc assembly 30 and the video disc, now being securely held for rotation, the finger 96 drops off a segment 102 of the cam 100 and allowed to drop clear of the video disc 25, to permit operation of the disc at high speed without interference.

Figure 13A:
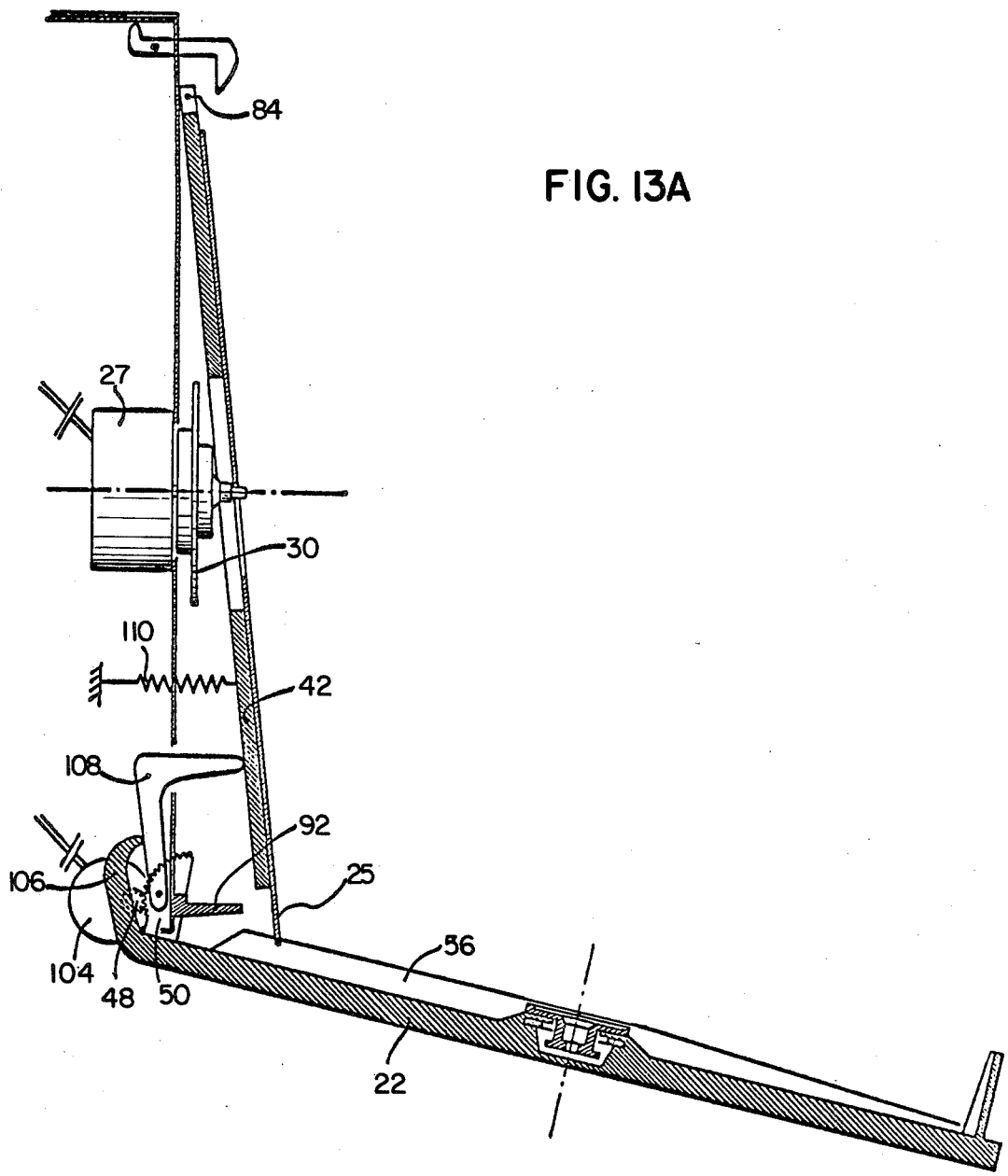
FIG. 13A is a diagrammatic view of the alternative embodiment of FIGS. 11-16 modified to be operated by a single drive motor.
Figure 14:
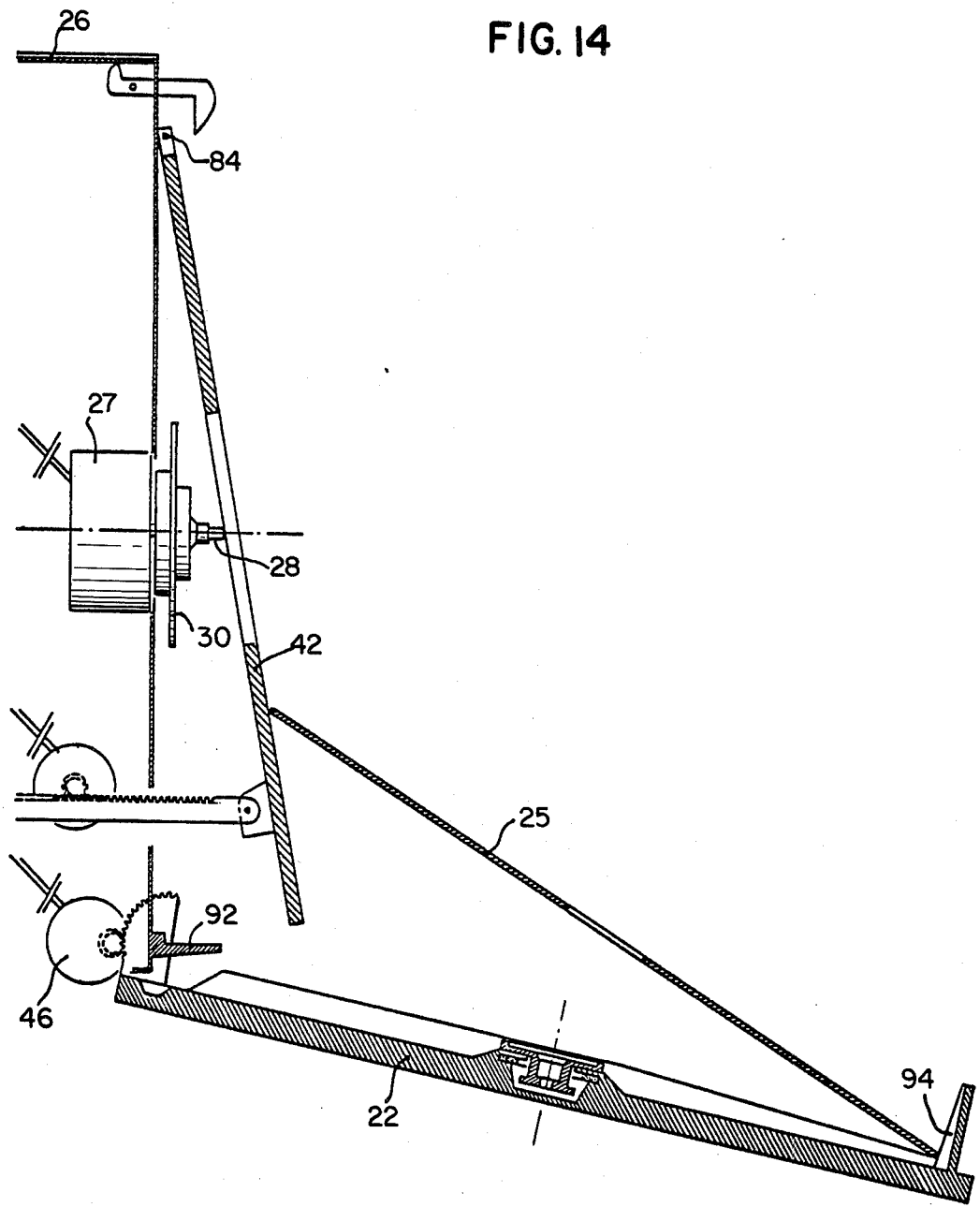

As a further embodiment of the invention, the video disc player apparatus shown in FIG. 13A includes a device for automatically turning over a video disc which utilizes a single drive motor 104 for both the back plate 42 and cover 22. According to this aspect of the invention, the cover 22 is provided with a curved lug 106 acting on an L-shaped lever 108 which serves to engage the underside of the back plate 42 and pivot the back plate 42 away from the chassis 26 as the cover 22 is pivoted by the drive motor 104 for the cover 22 via the pinion 48 and gear segment 50. A return spring 110 is provided to draw the back plate 42 to its vertical position as the cover 22 is rotated counterclockwise to return to its closed position. In this case, the lug 106 on the edge of the cover 22 and the L-shaped lever 108 link the movement of the back plate 42 to that of the cover 22 and enable both components to be operated under power from a single drive motor 104.

In all embodiments of the invention, the device for automatically turning over the video disc fits within the apparatus without requiring extra space. As has been pointed out, the device operates quickly so as to introduce a minimum delay in the playing of a recording which continues from one face of a video disc to the other face. Few extra components are required and only two small drive motors, resulting in low cost to include the device in video disc player apparatus. These and other features will be apparent from the foregoing description.

We claim:

1. In a video disc player apparatus having a base, means on the base for rotating a video disc, and a protective cover pivotally hinged on the base and forming therewith an enclosure for a video disc on said rotating means, and adapted to be opened and closed by pivotal movement to permit a disc to be inserted in or removed from said enclosure, the improvement comprising:
    a device for automatically turning over a disc carried by said rotating means, said device including:
    means associated with said cover for engaging and pivoting the disc about its bottom edge between substantially horizontal and vertical positions as an incident to pivotal movement of the cover;
    the turning over including a ninety degree phase in which the disc slides under its own weight between substantially vertical and horizontal positions while the bottom edge of the disc slides laterally and a ninety degree phase in which the disc pivots about said bottom edge between substantially horizontal and vertical positions; and
    means for guiding both said bottom edge and the top edge of the disc during its sliding movement and for supporting the bottom edge of the disc for pivotal movement about an axis adjacent the pivotal axis of said cover.

2. A device according to claim 1 for automatically turning over a disc carried by said rotating means in a horizontal playing position, said device further including:
    means including a catch engagable below one edge of a disc as said cover is opened for pivoting the disc from said horizontal playing position to a substantially vertical position as said cover is opened, said disc being slidable under its own weight through a ninety degree phase to substantially return to the horizontal playing position.

3. A device according to claim 1 for automatically turning over a disc carried by said rotating means in a horizontal playing position, said device further including:
    means on said base providing a support on which the bottom edge of the disc rests during its pivotal movement.

4. A device according to claims 1, 2 or 3 automatically turning over a disc carried by said rotating means in a horizontal playing position, said device further including:
  guide means on the underside of the cover for engaging a portion of the top edge of the disc and guiding the disc during its sliding movement;
  a back plate pivotally mounted on said base beneath a disc on said rotating means;
  means for elevating the back plate above said rotating means; and
  guide means on said back plate for engaging the disc on a portion of the bottom edge diametrically opposite the guided portion of the top edge during its sliding movement to a position above said rotating means and substantially aligned therewith.

5. A device according to claims 1, 2 or 3 for automatically turning over a disc carried by said rotating means in a horizontal playing position wherein said means associated with said cover engages and lifts the disc by a portion of one edge to pivot the disc about a bottom portion of the disc diametrically opposite the portion engaged to lift the disc.

6. A device according to claim 2 wherein said rotating means includes a magnet and said cover includes a pressure ring of magnetic material cooperating with said magnet to clamp a video disc and form a unitary rotary assembly, said device further including:
  guide means on the underside of the cover for engaging a portion of the top edge of the disc and guiding the disc during its sliding movement; and
  an annular magnet mounted in the cover for attracting and maintaining said pressure ring from interference with the top edge of the disc as it moves along said guide means.

7. A device according to claim 1 for automatically turning over a disc carried by said rotating means in a horizontal playing position, said device further comprising:
  means connected for movement with said cover for engaging said disc and pivoting the disc from said horizontal playing position to a substantially vertical position as said cover is opened, said disc being slidable under its own weight through a ninety degree phase to substantially return to the horizontal playing position while said cover remains open;
  powered means for opening and closing said cover;
  a back plate pivotally mounted on said base beneath said rotating means;
  guide means on said cover and back plate for guiding said disc during its sliding movement; and
  powered means for pivoting said back plate simultaneously with opening said cover to assist in the separation of said pressure ring from the magnet of said rotating means.

8. A device according to claim 2, 3 or 7 for automatically turning over a disc carried by said rotating means in a horizontal playing position, said device further including:
  means including a stop for interrupting the sliding movement of the disc in a intermediate position elevated above said rotating means, to facilitate manual removal or insertion of a disc while said cover remains open.

9. A device according to claim 2, 3 or 7 for automatically turning over a disc carried by said rotating means in a horizontal playing position, said device further including:
  powered means for opening and closing said cover;
  a back plate pivotally mounted on said base beneath said rotating means;
  guide means on said cover and back plate for guiding said disc during its sliding movement; and
  powered means for pivoting said back plate to elevate said back plate above said rotating means to avoid interference with the bottom edge of the disc so it moves along said guide means on said back plate.

10. A device according to claim 1 for automatically turning over a disc carried by said rotating means in a horizontal playing position, said device further including:
  powered means for opening and closing said cover; and
  means on said cover for engaging a disc and pivoting the disc to a substantially vertical position as an incident to opening the cover.

11. A device according to claim 1 for automatically turning over a disc carried by said rotating means in a horizontal playing position, said device further including:
  powered means for opening and closing said cover;
  means on said cover for engaging an edge portion of said disc and pivoting said disc from said horizontal playing position to a substantially vertical position as an incident to opening the cover; and
  means on said cover and base for guiding a disc during its sliding phase from said substantially vertical position to said horizontal playing position.

12. A device according to claim 1 for automatically turning over a disc carried by said rotating means in a vertical playing position, said device further including:
  powered means for opening and closing said cover;
  means on said cover and base for guiding a disc during its sliding phase from: said vertical playing position to a substantially horizontal position; and
  a support on the base for supporting the bottom edge of the disc during its pivoting phase from said horizontal position to return to said playing position as an incident to closing the cover.

13. A device according to claim 12 for automatically turning over a disc carried by said rotating means in a vertical playing position, said device further including:
  a back plate pivotally mounted on said base beneath a disc on said rotating means;
  means for pivoting said back plate away from said base to a position outward of said rotating means;
  guides on the back plate for engaging the disc during its sliding movement.

14. A device according to claim 1 for automatically turning over a disc carried by said rotating means in a vertical playing position, said device further including:
  means for opening said cover to a substantially horizontal position and closing said cover;
  means including a stop on said cover for interrupting the sliding movement of the disc from said vertical position to a substantially horizontal position on said cover; and
  means for returning said disc to the vertical position as an incident to closing the cover.

15. A device according to claim 12 for automatically turning over a disc carried by said rotating means in a vertical playing position, said device further including:
  powered means for opening and closing the cover;
  a member on said base for maintaining the disc in the vertical playing position during the opening movement of the cover; and means for separating the disc from said maintaining means and starting the disc in its sliding phase after the cover is opened.

16. A device according to claim 12 for automatically turning over a disc carried by said rotating means in a vertical playing position; said device further including:
   a back plate pivotally mounted on said base beneath a disc on said rotating means;
   powered means for opening and closing said cover and for pivoting said back plate relative to said base to a position outward of said rotating means; and
   guides on said back plate and cover for guiding the disc during its sliding movement, said back plate being maintained in a position to prevent interference between said rotating means and the edge of the disc during its sliding movement.

17. A device according to claim 16 for automatically turning over a disc carried by said rotating means, said device further including:
   a linkage linking the movement of said back plate to the cover for operation thereof by a single motor.

18. A device according to claim 17 for automatically turning over a disc carried by said rotating means in a vertical playing position, said device further including:
   means for maintaining the disc in the vertical position on said rotating means during the opening movement of the cover; and
   means including said linkage for releasing the disc from said maintaining means when the cover reaches its opening position.

19. In a video disc player apparatus having a base, means on the base for rotating a video disc while in vertical position, and a protective cover hinged on the base and forming therewith an enclosure for a video disc on said rotating means, and adapted to be opened and closed to permit a disc to be inserted in or removed from said enclosure, the improvement comprising:
   a device for automatically turning over a disc carried vertically on said rotating means, said device including:
   powered means for opening said cover to a substantially horizontal position and closing said cover;
   means for maintaining a disc in vertical position on said rotating means as said cover is opened;
   means for releasing a disc from said maintaining means, allowing the bottom edge of the disc to move laterally and the disc to slide under its own weight to a substantially horizontal position on said cover;
   means associated with said cover for engaging said disc and pivoting the disc about its bottom edge to return the disc to said rotating means as an incident to closing said cover; and
   means on said base for supporting said bottom edge of the disc during its pivotal movement.

20. In a video disc player apparatus according to any of claims 12-19, means engaging the bottom edge of the disc for centering the disc as it is returned to said rotating means, and means for separating said centering means from engagement with said disc for operation by said rotating means.

21. In a video disc player apparatus having a base, means on the base for rotating a video disc while in a horizontal position, and a protective cover pivotally hinged on the base and forming therewith an enclosure for a video disc on said rotating means, and adapted to be opened and closed to permit a disc to be inserted in or removed from said enclosure, the improvement comprising:
   a device for automatically turning over a disc carried horizontally on said rotating means, said device including:
   means on said cover for engaging the disc as an incident to opening said cover and turning the disc through a ninety degree phase in which the disc pivots about its bottom edge between said horizontal position on said rotating means and a substantially vertical position;
   a moveable member on said base cooperating with said cover and including means for guiding both said bottom edge and the top edge of the disc as said disc turns through a ninety degree phase in which the disc slides under its own weight between said substantially vertical position and a horizontal position on said rotating means.

22. In a video disc player apparatus having a base, means on the base for rotating a video disc while in horizontal position, and a protective cover hinged on the base and adapted to be opened and closed to permit a disc to be inserted or removed therefrom, the improvement comprising:
   a device for automatically turning over a disc carried horizontally on said rotating means, said device including:
   means associated with said cover for lifting one edge of a disc while carried on said rotating means as an incident to opening the cover, and pivoting the disc about the diametrically opposite bottom edge past a vertical plane;
   means on said base for supporting said bottom edge of the disc during its pivotal movement and holding said bottom edge of the disc against lateral movement;
   means for releasing said holding means, allowing the bottom edge of the disc to move laterally and the disc to slide under its own weight to a horizontal position on said support and rotating means; and
   means on said base and cover for guiding both said bottom edge and the top edge of the disc during its sliding movement.

* * * * *

UNITED STATES PATENT AND TRADEMARK OFFICE
CERTIFICATE OF CORRECTION

PATENT NO. : 4,447,900
DATED : May 8, 1984
INVENTOR(S) : Schatteman et al

It is certified that error appears in the above-identified patent and that said Letters Patent is hereby corrected as shown below:

On the cover sheet, Item [73] Assignee should read as follows:

-- [73] Assignee: Staar S. A. Brussels, Belgium --

Signed and Sealed this

Ninth Day of October 1984

[SEAL]

Attest:

GERALD J. MOSSINGHOFF

Attesting Officer

Commissioner of Patents and Trademarks